(12) United States Patent
Ahn

(10) Patent No.: US 8,609,266 B2
(45) Date of Patent: Dec. 17, 2013

(54) BATTERY PACK

(75) Inventor: Janggun Ahn, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/359,869

(22) Filed: Jan. 27, 2012

(65) Prior Publication Data

US 2012/0214027 A1    Aug. 23, 2012

Related U.S. Application Data

(60) Provisional application No. 61/444,291, filed on Feb. 18, 2011.

(51) Int. Cl.
*H01M 2/00* (2006.01)
*H01M 2/06* (2006.01)
*H01M 2/20* (2006.01)

(52) U.S. Cl.
USPC ............. 429/7; 429/159; 429/178; 429/149; 174/257

(58) Field of Classification Search
USPC ............. 429/7, 122, 96–100, 208, 163–187; 221/282; 206/703; 320/107, 128, 320/130–131; 29/745–746; 340/636.1–636.21
See application file for complete search history.

(56) References Cited

U.S. PATENT DOCUMENTS

| | | |
|---|---|---|
| 2005/0271934 A1 | 12/2005 | Kiger et al. |
| 2006/0032667 A1 | 2/2006 | Sato |
| 2006/0160422 A1 | 7/2006 | Bang et al. |
| 2007/0154793 A1 | 7/2007 | Bang et al. |
| 2009/0117458 A1* | 5/2009 | Yun .............................. 429/178 |
| 2009/0154048 A1 | 6/2009 | Jang et al. |
| 2009/0246615 A1 | 10/2009 | Park |
| 2010/0266891 A1* | 10/2010 | Kwon et al. .................. 429/159 |
| 2011/0195284 A1 | 8/2011 | Yasui et al. |
| 2011/0206957 A1* | 8/2011 | Byun ............................. 429/56 |

FOREIGN PATENT DOCUMENTS

| | | | | |
|---|---|---|---|---|
| EP | 1804561 | * | 4/2007 | ............... H05K 3/36 |
| JP | 10-031993 A | | 2/1998 | |
| JP | 2004-022451 A | | 1/2004 | |

(Continued)

OTHER PUBLICATIONS

Machine Translation of Kim et al. (KR 10-2005-0126137, Published Jun. 2007).*

(Continued)

*Primary Examiner* — Basia Ridley
*Assistant Examiner* — Caitlin Wilmot
(74) *Attorney, Agent, or Firm* — Robert E. Bushnell, Esq.

(57) ABSTRACT

A battery pack that prevents a short from being generated when an insulation film near coupling holes formed in the conforming cover is broken by the connection tab due to external impacts and penetrates into the wire while or after the connection tab is assembled with the conforming cover through the coupling holes. The battery pack includes battery cells, a connection tab connecting the battery cells to each other in series or parallel, a conforming cover having a wire and coupling holes formed at one side thereof to allow the connection tab to pass therethrough, the conforming cover electrically connected to the connection tab, a protection circuit module electrically connected to the conforming cover and controlling charging and discharging of the battery cells, and a reinforcing member surrounding at least both sides of upper and lower edges among outer peripheral portions of the coupling holes formed in the conforming cover.

20 Claims, 11 Drawing Sheets

(56) References Cited

FOREIGN PATENT DOCUMENTS

| JP | 2010140695 | 6/2010 |
|----|------------|--------|
| KR | 10-2007-0065560 | 6/2007 |
| KR | 1020090064961 | 6/2009 |
| KR | 10-2009-0104584 | 10/2009 |
| WO | 2010067602 A1 | 6/2010 |

OTHER PUBLICATIONS

Extended European Search Report issued Jun. 4, 2012 in connection with European Patent Application Serial No. 12153813.6, which claims priority from the present application, pp. 1-5.

European Office Action dated May 7, 2013 issued by EPO which claims European Patent Application 12153813.6.

Korean Office Action dated Mar. 26, 2013 issued by KIPO in connection with Korean Patent Application Serial No. 10-2012-0009255 which claims priority from the present application and Request for Entry of the Accompanying Office Action attached.

Korean Notice of Allowance issued on Aug. 30, 2013 by KIPO, corresponding to Korean Patent Application No. 10-2012-0009255. Request for Entry of the Accompanying Office Action Attached herewith.

* cited by examiner

BATTERY PACK

CLAIM OF PRIORITY

This application makes reference to, incorporates the same herein, and claims all benefits accruing under 35 U.S.C. §119 from an application for BATTERY PACK earlier filed in the U.S. Patent & Trademark Office on 18 Feb. 2011 and there duly assigned Ser. No. 61/444,291.

BACKGROUND OF THE INVENTION

1. Field of the Invention

Embodiments of the present invention relate to a battery pack that has a more durable structure that is less apt to be damaged by external impact and is less apt to be damaged upon assembly.

2. Description of the Related Art

A battery pack includes a plurality of battery cells, a connection tab connecting the battery cells to each other in series or in parallel, a protection circuit module (PCM) controlling charging and discharging of the battery cells, and a conforming cover electrically connecting the battery cells to the PCM. However, as designs for battery packs become more compact, and as the designs use less expensive components, the resultant battery pack is more apt to be damaged during assembly, upon external impact or with ordinary use of the device. Therefore, what is needed is a design for a battery pack that is less apt to be damaged or shorted out during assembly, during external impact, and during ordinary use.

SUMMARY OF THE INVENTION

Embodiments are directed to a battery pack, which represents an advancement in the related art.

It is a feature of an embodiment to provide a battery pack, which can prevent a short from being generated when an insulation film in the vicinity of the coupling holes formed in the conforming cover is broken by the connection tab due to external impact and penetrates into the wire while or after the connection tab is being assembled to the conforming cover through the coupling holes.

According to one aspect of the present invention, there is provided a battery pack that includes a battery cell, a connection tab electrically connected to the battery cell, a protection circuit module (PCM) electrically connecting the battery cell to an external device, a flexible printed circuit board (FPCB) including a wire arranged within an insulation film, the wire electrically connecting the PCM to the connection tab connected to the battery cell, the FPCB further including a coupling aperture through which the connection tab extends therethrough and a reinforcing member that surrounds at least a portion of the coupling aperture and being arranged in a vicinity of the coupling aperture. The connection tab may include a battery contact portion directly welded to a terminal of the battery cell, a pad contact portion arranged opposite from the battery contact portion and being electrically connected to the wire of the FPCB and a bend portion arranged between the battery contact portion and the pad contact portion, the bend portion adapted to allow the pad contact portion to bend with respect to the battery contact portion.

The reinforcing member may include an insulation tape or a metal. The insulation film may include polyimide, the reinforcing member may include one of a copper foil, a nickel foil and a steel foil coated/plated with nickel. The reinforcing member may have a thickness greater than the insulation film. The reinforcing member may have a hardness that is at least as great as that of the wire. The reinforcing member may prevent the FPCB from being broken in a vicinity of the coupling aperture by the connection tab. The connection tab may be interference fit with the FPCB at the coupling aperture of the FPCB. The reinforcing member may include a same material as the wire and may be integrally formed with said wire of the FPCB. The coupling aperture may be an elongated rectangle with a pair of long edges connected by a pair of short edges, the reinforcing member of the FPCB may be arranged in a vicinity of the short edges of the coupling aperture and at an adjoining portion of the long edges of the coupling aperture. The reinforcing member of the FPCB may completely surround the coupling aperture. The reinforcing member may surround an outer periphery of the coupling aperture and may be spaced-apart from outer peripheral sides of the coupling aperture. The reinforcing member may surround an outer periphery of the coupling aperture, have an aperture sized and shaped to correspond to the coupling aperture at its center, a size of the aperture of the reinforcing member may be greater than that of the coupling aperture, the reinforcing member may be spaced-apart from outer peripheral sides of the coupling aperture. The reinforcing member may entirely surround an outer periphery of the coupling aperture, the reinforcing member may be in contact with outer peripheral sides of the coupling aperture.

A battery pack, including a battery cell, a connection tab electrically connected to the battery cell, a protection circuit module (PCM) electrically connecting the battery cell to an external device and a flexible printed circuit board (FPCB) including a wire arranged within an insulation layer to electrically connect the PCM to the connection tab, wherein the FPCB further includes a battery contact pad arranged within a first opening in the insulation film to connect the wire to the connection tab, a coupling aperture arranged near the battery contact pad, the connection tab extending through the coupling aperture, a module connecting pad arranged within a second opening in the insulation film to connect the wire to the PCM, and a reinforcing member arranged in a vicinity of the coupling aperture to prevent the FPCB from tearing in the vicinity of the coupling aperture.

The connection tab may include a battery contact portion welded directly to a terminal of the battery cell, a pad contact portion arranged opposite from the battery contact portion and being attached to the wire of the FPCB and a bend portion arranged between the battery contact portion and the pad contact portion, the bend portion to allow the pad contact portion to bend with respect to the battery contact portion. The reinforcing member may include one of a copper foil, a nickel foil and a steel foil coated/plated with nickel. The reinforcing member may have a thickness greater than the insulation film. The reinforcing member may include a same material as the wire and being electrically connected to the wire. The pad contact portion of the connection tab may be perforated by an aperture and may be connected to the battery contact pad of the FPCB by a core-wire solder layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, embodiments of the present invention will be described in detail with reference to the accompanying drawings.

Figure 1:
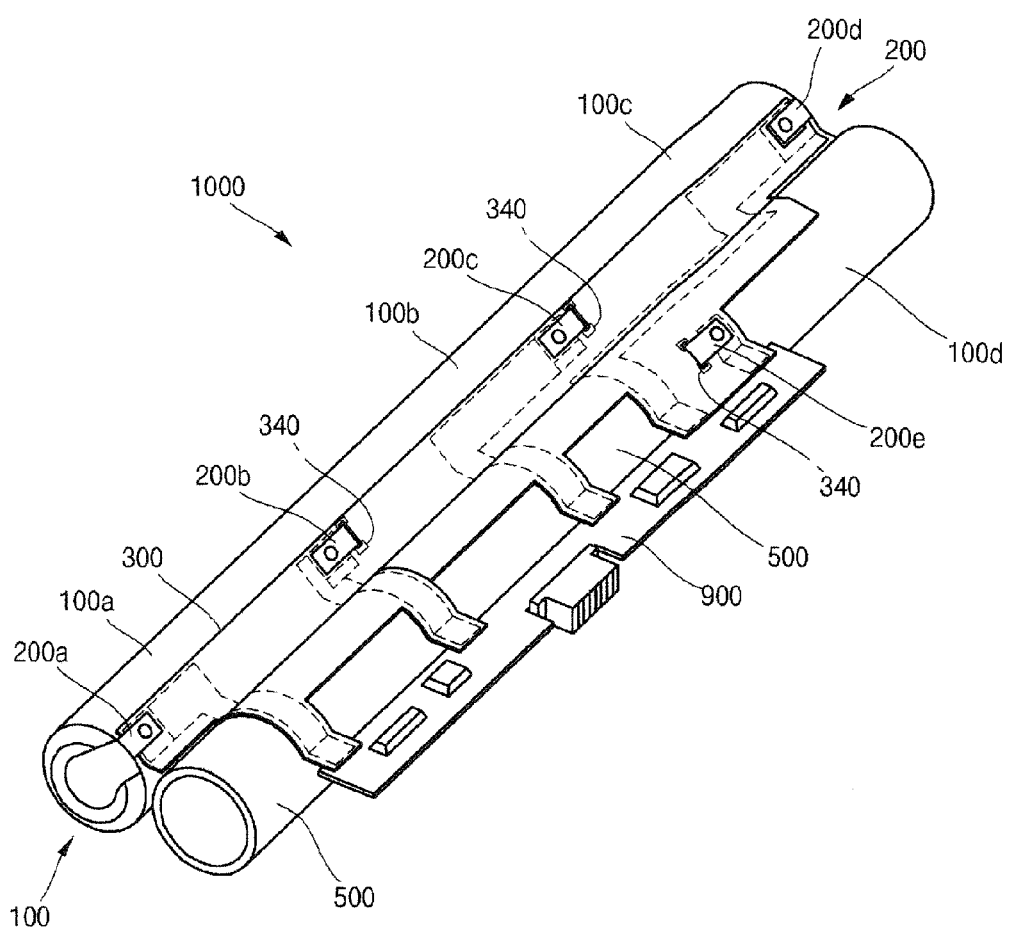
FIG. 1 is a perspective view of a battery pack according to an embodiment of the present invention.
Figure 2:
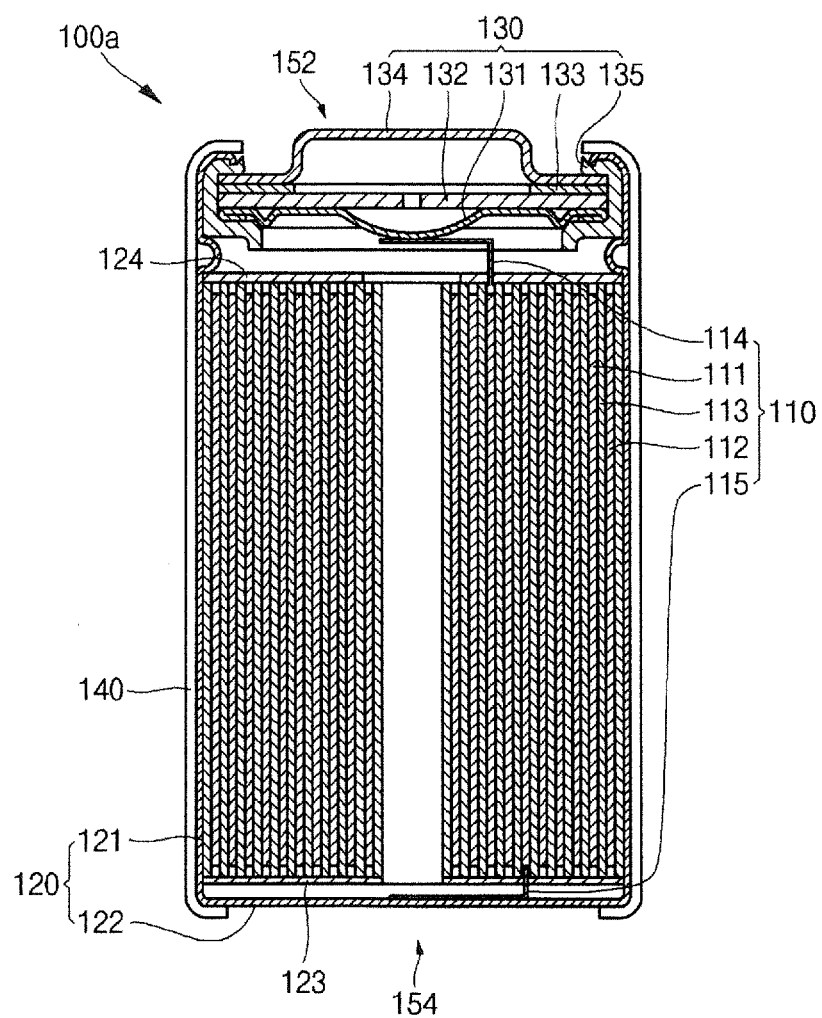
FIG. 2 is a cross-sectional view of a battery cell constituting the battery pack shown in FIG. 1.

Turning now to FIGS. 1 and 2, FIG. 1 is a perspective view of a battery pack 1000 according to an embodiment of the present invention and FIG. 2 is a cross-sectional view of a battery cell 100a constituting the battery pack 1000 shown in FIG. 1.

Referring to FIGS. 1 and 2, the battery pack 1000 according to the illustrated embodiment of the present invention may include at least one battery cell 100, at least one connection tab 200, a conforming cover 300, and a protection circuit module (PCM) 900. If necessary, the battery pack 1000 may further include one or more dummy cells 500.

In the following description, the present invention will be described with regard to the battery pack 1000 including four battery cells 100 and two dummy cells 500 by way of example, but the present invention does not limit the numbers and shapes of the battery cells 100 and the dummy cells 500 to those illustrated herein.

The battery pack 1000 includes a first battery cell 100a, a second battery cell 100b, a third battery cell 100c and a fourth battery cell 100d, which have cylindrical shapes. Since the first to fourth battery cells 100a-100d are the same, the following description will be made with regard to only the first battery cell 100a.

As illustrated in FIG. 2, the first battery cell 100a may include an electrode assembly 110, a can 120, a cap assembly 130 and a label 140. The electrode assembly 110 includes a first electrode plate 111, a second electrode plate 112 and a separator 113 interposed between the first electrode plate 111 and the second electrode plate 112. The first electrode plate 111, the second electrode plate 112 and the separator 113 may be wound together.

In addition, the electrode assembly 110 includes a first electrode lead 114 electrically connected to the first electrode plate 111, and a second electrode lead 115 electrically connected to the second electrode plate 112. The first electrode lead 114 is electrically connected to the cap assembly 130, and the second electrode lead 115 is electrically connected to the can 120.

Here, the first electrode plate 111 may be a positive electrode plate, and the second electrode plate 112 may be a negative electrode plate, or vice versa. In this embodiment, the first electrode plate 111 is a positive electrode plate, and the second electrode plate 112 is a negative electrode plate. Therefore, the cap assembly 130 electrically connected to the first electrode plate 111 may be a positive electrode terminal 152, and the can 120, specifically a bottom surface 122 of the can 120, may be a negative electrode terminal 154.

The can 120 is formed of a substantially cylindrical metal case having an opening at its top portion. The can 120 has a cylindrical surface 121 having a predetermined diameter and a bottom surface 122, providing for a space for housing the electrode assembly 110. The electrode assembly 110 is housed within the can 120.

The electrode assembly 110, a lower insulation plate 123, and an upper insulation plate 124 are included within the space of the can 120. When the electrode assembly 110 is housed within the can 120, the lower insulation plate 123 and the upper insulation plate 124 may be provided at bottom and top portions of the electrode assembly 110 to prevent a short circuit between the first electrode plate 111 and the second electrode plate 112 of the electrode assembly 110 due to a contact therebetween.

The cap assembly 130 seals the opening of the can 120. The cap assembly 130 includes a safety vent 131 actuated when an internal pressure of the battery cell 100a increases to greater than a predetermined level, a current breaker 132 provided above the safety vent 131 and electrically and mechanically connected thereto to then be disconnected when the safety vent 131 is actuated, a positive temperature coefficient (PTC) 133 provided above the current breaker 132 and electrically and mechanically connected thereto to then abruptly increase resistance when the internal temperature of the battery cell 100a, a cap-up 134 provided above the PTC 133 and electrically and mechanically connected thereto, and a gasket 135 insulating the safety vent 131, the current breaker 132, the PTC 133 and the cap-up 134 from the can 120 while surrounding side perimeters of the safety vent 131, the current breaker 132, the PTC 133 and the cap-up 134.

The label 140 covers at least the cylindrical surface 121 of the can 120 to protect the cylindrical surface 121 and allows the cap assembly 130, specifically the cap-up 134, serving as the positive electrode terminal 152, to be exposed to the outside, and the bottom surface 122 of the can 120, serving as the negative electrode terminal 154, to be exposed to the outside. The label 140 may be made out of a thermally shrinkable film.

Figure 3:
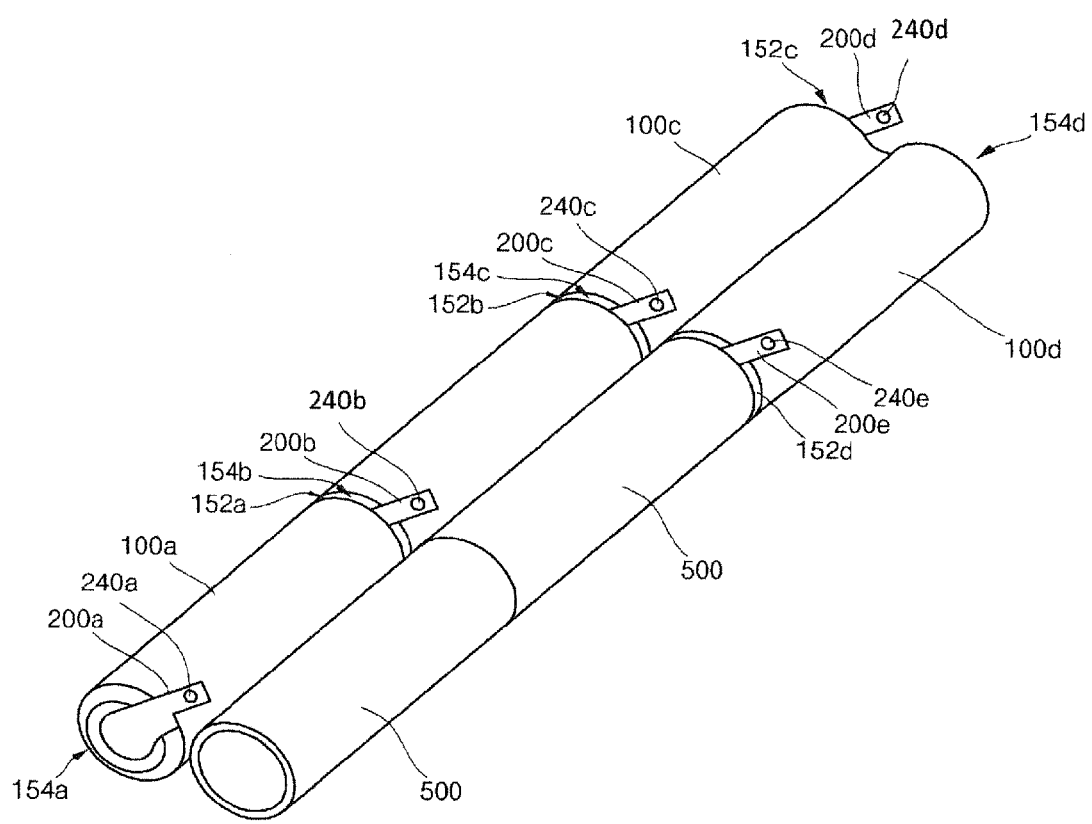
FIG. 3 is a perspective view illustrating battery cells and connection tabs constituting the battery pack shown in FIG. 1.
Figure 4A:
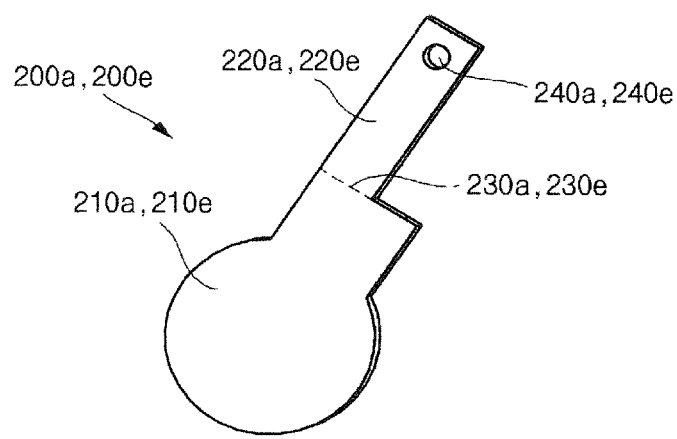
FIG. 4A is a perspective view illustrating a first connection tab and a fifth connection tab constituting the battery pack shown in FIG. 1.
Figure 4B:
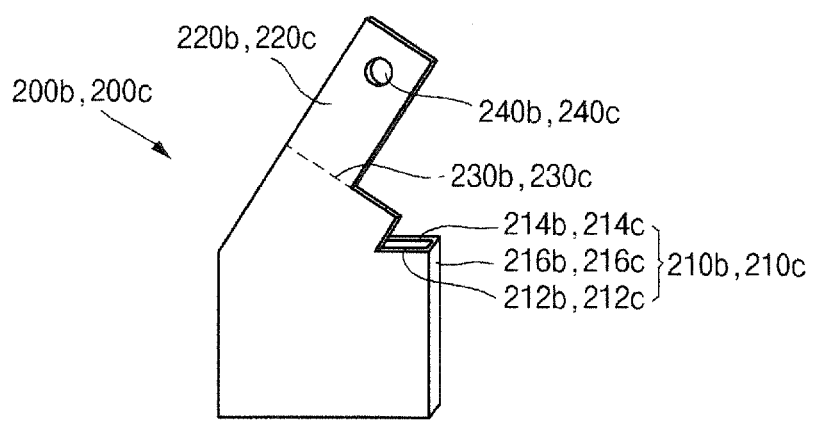
FIG. 4B is a perspective view illustrating a second connection tab and a third connection tab constituting the battery pack shown in FIG. 1.
Figure 4C:
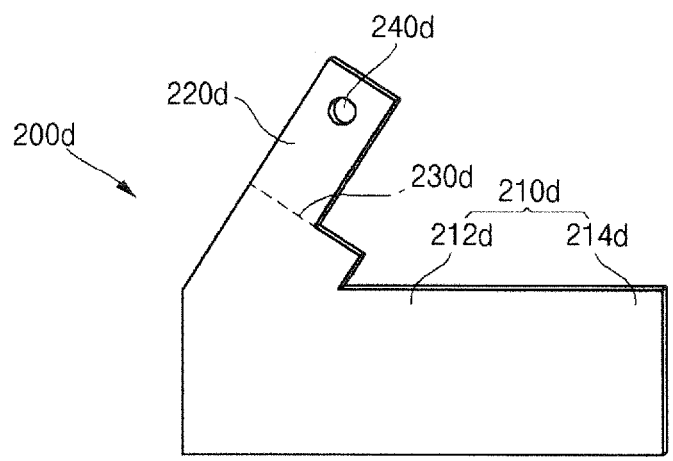
FIG. 4C is a perspective view illustrating a fourth connection tab constituting the battery pack shown in FIG. 1.

Turning now to FIGS. 3 through 4C, FIG. 3 is a perspective view illustrating battery cells and connection tabs constituting the battery pack 1000 shown in FIG. 1, FIG. 4A is a perspective view illustrating a first connection tab 200a and a fifth connection tab 200e constituting the battery pack shown in FIG. 1, FIG. 4B is a perspective view illustrating a second connection tab 200b and third connection tab 200c constituting the battery pack shown in FIG. 1, and FIG. 4C is a perspective view illustrating a fourth connection tab 200d constituting the battery pack shown in FIG. 1.

Referring to FIGS. 3, 4A, 4B and 4C, the first battery cell 100a, the second battery cell 100b, the third battery cell 100c and the fourth battery cell 100d are serially connected to each other by the connection tabs 200b, 200c and 200d. Here, the battery pack 1000 may have two or more rows of the battery cells 100 arranged in consideration of the capacity and volume.

The connection tab 200 includes a first connection tab 200a, a second connection tab 200b, a third connection tab 200c, a fourth connection tab 200d and a fifth connection tab 200e.

The first connection tab 200a is connected to a negative electrode terminal of the first battery cell 100a, the second connection tab 200b is simultaneously connected to a positive electrode terminal of the first battery cell 100a and a negative electrode terminal of the second battery cell 100b, the third connection tab 200c is simultaneously connected to a positive electrode terminal of the second battery cell 100b and a negative electrode terminal of the third battery cell 100c, the fourth connection tab 200d is simultaneously connected to a positive electrode terminal of the third battery cell 100c and a negative electrode terminal of the fourth battery cell 100d, and the fifth connection tab 200e is connected to a positive electrode terminal of the fourth battery cell 100d. Therefore, the first connection tab 200a of the connection tab 200 becomes a negative electrode of the battery pack 1000, and the fifth connection tab 200e becomes a positive electrode of the battery pack 1000. The battery cells 100 and the connection tabs 200 are coupled to each other by welds, and the weld may be produced by a resistance welding technique.

Since the first connection tab 200a and the fifth connection tab 200e are connected to an electrode terminal (a positive electrode terminal or a negative electrode terminal) of the battery pack 1000, they have the same configuration and will now be described together.

Referring to FIG. 4A, the first connection tab 200a and the fifth connection tab 200e include battery contact portions 210a and 210e, pad contact portions 220a and 220e, bend portions 230a and 230e and cored-wire solder receiving holes 240a and 240e, respectively.

The battery contact portions 210a and 210e contact the battery cells 100, and may be configured such that portions thereof correspond to negative electrode terminals and positive electrode terminals of the battery cells 100.

The pad contact portions 220a and 220e are connected to the battery connecting pads 311a and 311e of the conforming cover 300, which will later be described, and extend from one side of the battery contact portions 210a and 210e respectively.

The bend portions 230a and 230e are positioned between the battery contact portions 210a and 210e and the pad contact portions 220a and 220e, respectively, and correspond to regions where the first connection tab 200a and the fifth connection tab 200e are bent in a substantially 'inverted L' ('¬') shape.

In more detail, the bend portions 230a and 230e are formed at locations where widths of the battery contact portions 210a and 210e are different from those of the pad contact portions 220a and 220e. Since the widths of the battery contact portions 210a and 210e are different from those of the pad contact portions 220a and 220e, when a force is applied to the pad contact portions 220a and 220e in a state in which the battery contact portions 210a and 210e are welded to the battery cells 100a and 100e respectively, the bend portions 230a and 230e bend, so that the first connection tab 200a and the fifth connection tab 200e are bent in a substantially 'inverted L' ('¬') shape.

Since the second connection tab 200b and the third connection tab 200c simultaneously contact the positive electrode terminal and the negative electrode terminal of neighboring one of the battery cells 100, they have the same configuration and will now be described together.

Referring to FIG. 4B, the second connection tab 200b and the third connection tab 200c include battery contact portions 210b and 210c, pad contact portions 220b and 220c, bend portions 230b and 230c and cored-wire solder receiving holes 240b and 240c, respectively.

Since the battery contact portions 210b and 210c contact two electrode terminals of neighboring battery cells 100, they include first battery contact plates 212b and 212c, second battery contact plates 214b and 214c arranged parallel to first battery contact plates 212b and 212c respectively, and connecting plates 216b and 216c connecting the first battery contact plates 212b and 212c to the second battery contact plates 214b and 214c, respectively while supporting the first battery contact plates 212b and 212c and the second battery contact plates 214b and 214c.

The pad contact portions 220b and 220c are connected to the battery connecting pads 311b and 311c of the conforming cover 300, which will later be described, and extend from one of the first battery contact plates 212b and 212c or the second battery contact plates 214b and 214c.

The bend portions 230b and 230c are positioned between the battery contact portions 210b and 210c and the pad contact portions 220b and 220c, respectively, and correspond to regions where the second connection tab 200b and the third connection tab 200c are bent in a substantially 'inverted L' ('¬') shape.

In more detail, the bend portions 230b and 230c are formed at locations where widths of the battery contact portions 210b and 210c are different from those of the pad contact portions 220b and 220c. Since the widths of the battery contact portions 210b and 210c are different from those of the pad contact portions 220b and 220c, when a force is applied to the pad contact portions 220b and 220c in a state in which the battery contact portions 210b and 210c are welded to the battery cells 100, the bend portions 230b and 230c bend, so that the second connection tab 200b and the third connection tab 200c have a substantially 'inverted L' ('¬') shape.

Unlike the second and third connection tabs 200b and 200c, the fourth connection tab 200d contact battery cells 100 of differing columns, while they simultaneously contact the positive electrode terminal and the negative electrode terminal differing battery cells 100.

Referring to FIG. 4C, the fourth connection tab 200d includes a battery contact portion 210d, a pad contact portion 220d, a bend portion 230d and a cored-wire solder receiving hole 240d.

Since the battery contact portion 210d of the fourth connection tab 200d must contact two electrode terminals parallel with each other, battery contact portion 210d has a larger width than the other battery contact portions 210a and 210e of the first and fifth connection tabs 200a and 200e. Battery contact portion 210d of the fourth connection tab 200d are the same as the first battery contact plates 212b and 212c of the battery contact portions 210b and 210c shown in FIG. 4B when the connecting plates 216b and 216c and the second battery contact plates 214b and 214c are not bent but are straightly formed.

The pad contact portion 220d extends from the battery contact portion 210d, and contacts a battery connecting pad 311d of the conforming cover 300, which will later be described. That is to say, the pad contact portion 220d is welded to the battery connecting pad 311d.

The bend portion 230d is positioned between the battery contact portion 210d and the pad contact portion 220d and is a region where the fourth connection tab 200d is bent in a substantially 'inverted L' ('¬') shape.

In more detail, the bend portion 230d is formed at a location where a width of the battery contact portion 210d is different from that of the pad contact portion 220d. Since the width of the battery contact portion 210d is different from that of the pad contact portion 220d, when a force is applied to the pad contact portion 220d in a state in which the battery contact portion 210d is welded to the battery cells 100, the bend portion 230d bends, so that the fourth connection tab 200d has a substantially 'inverted L' ('¬') shape, as shown in FIG. 1.

Cored-wire solder receiving holes 240a, 240b, 240c, 240d and 240e are positioned at ends of the pad contact portions 220a, 220b, 220c, 220d and 220e respectively formed at the first connection tab 200a, the second connection tab 200b, the third connection tab 200c, the fourth connection tab 200d and the fifth connection tab 200e respectively.

The cored-wire solder receiving holes 240a, 240b, 240c, 240d and 240e are connected to the battery connecting pads 311a, 311b, 311c, 311d and 311e respectively such that solder of a cored-wire solder layer 315 formed on the battery connecting pads 311a, 311b, 311c, 311d and 311e flows in and is solidified when they are welded to the battery connecting pads 311a, 311b, 311c, 311d and 311e of the conforming cover 300, which will later be described.

Figure 5:
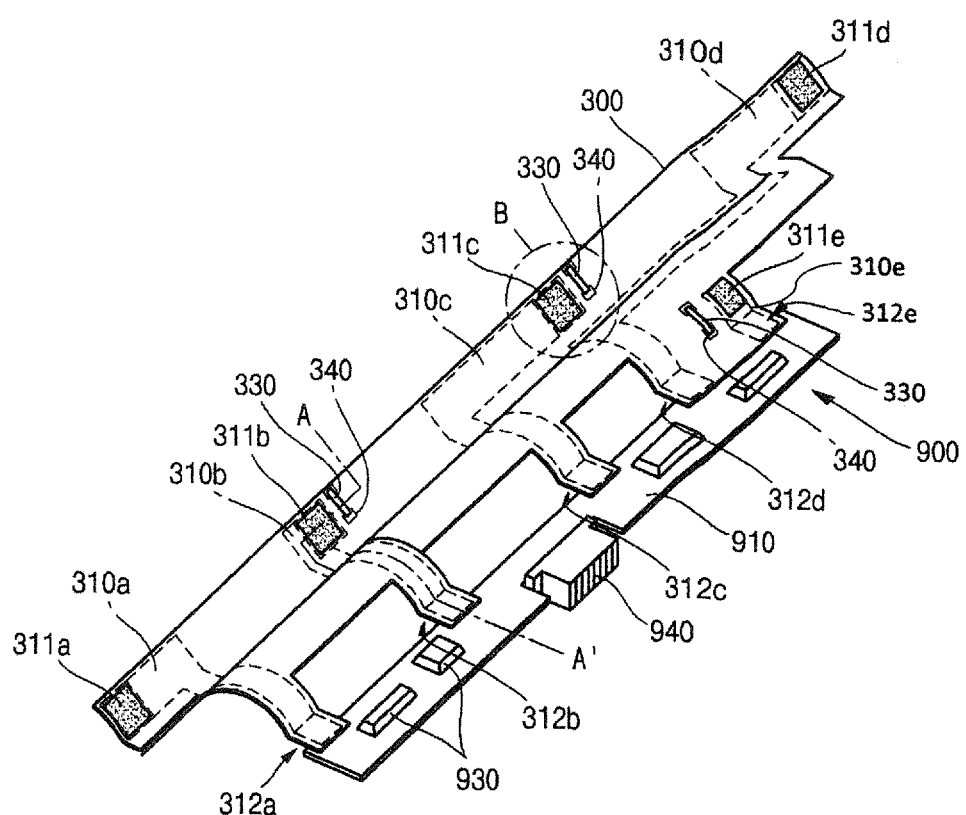
FIG. 5 is a perspective view illustrating a conforming cover according to an embodiment of the present invention.
Figure 6A:
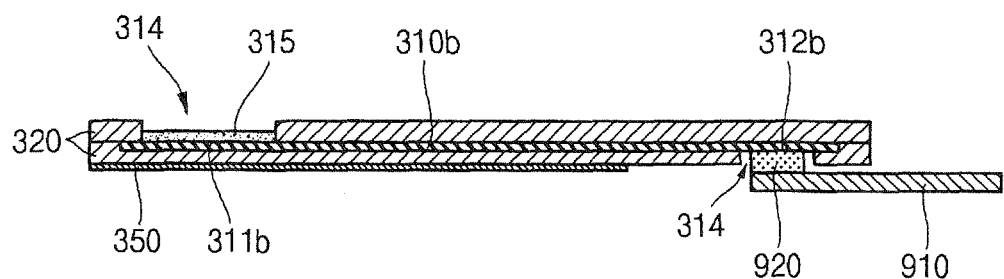
FIG. 6A is a cross-sectional view of the conforming cover shown in FIG. 5, taken along the line A-A'.
Figure 6B:
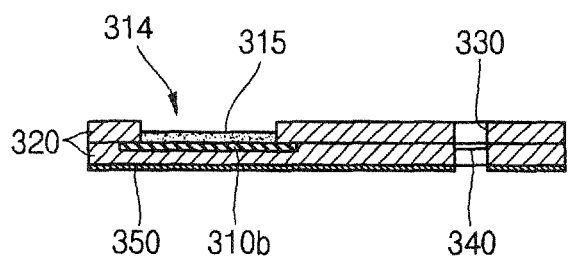
FIG. 6B is a cross-sectional view of the conforming cover shown in FIG. 5, taken along the line B-B'.
Figure 6C:
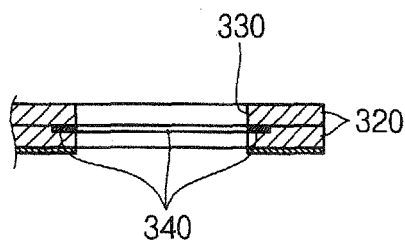
FIG. 6C is a cross-sectional view of the conforming cover shown in FIG. 5, taken along the line C-C'.
Figure 7A:
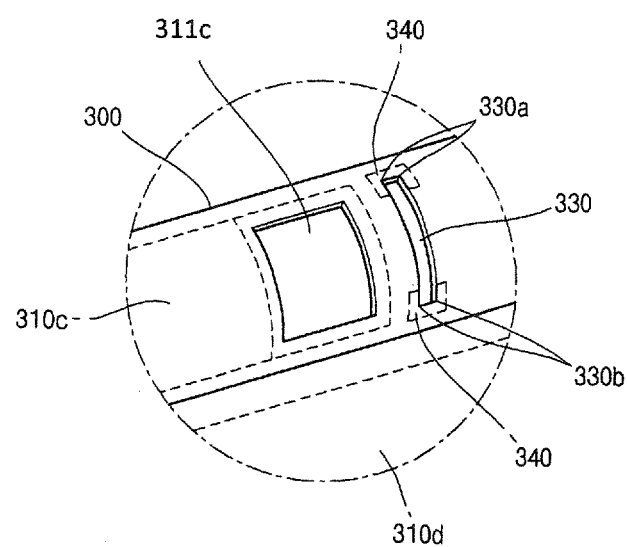
FIG. 7A is a partially enlarged view of a portion 'D' of the conforming cover shown in FIG. 5 which includes a reinforcing member according to an embodiment of the present invention.
Figure 7B:
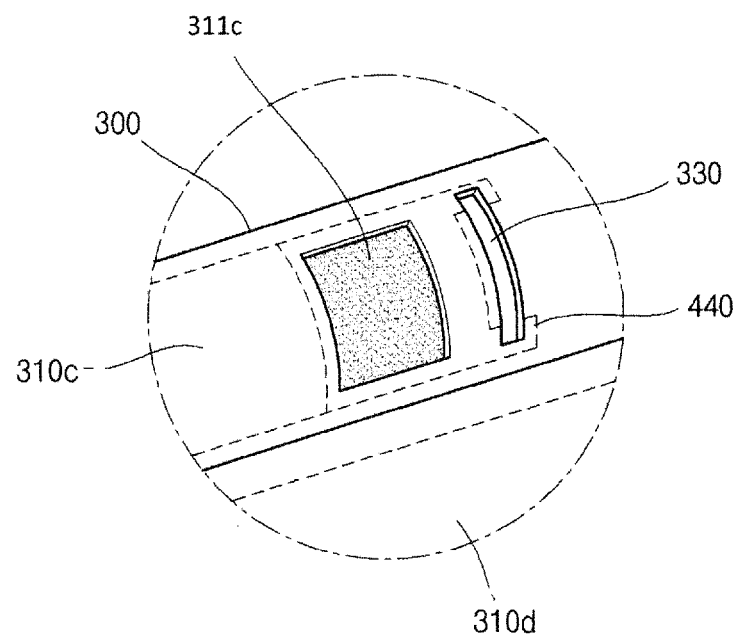
FIG. 7B is a partially enlarged view of portion 'D' of the conforming cover shown in FIG. 5 which includes a reinforcing member according to another embodiment of the present invention.

Turning now to FIGS. 5 through 7B, FIG. 5 is a perspective view illustrating a conforming cover 300 according to an embodiment of the present invention, FIG. 6A is a cross-sectional view of the conforming cover 300 shown in FIG. 5, taken along the line A-A', FIG. 6B is a cross-sectional view of the conforming cover shown in FIG. 5 taken along the line B-B', FIG. 6C is a cross-sectional view of the conforming cover shown in FIG. 5 taken along the line C-C', FIG. 7A is a partially enlarged view of a portion 'D' shown in FIG. 5, including a reinforcing members according to an embodiment of the present invention, and FIG. 7B is a partially enlarged view of portion 'D' shown in FIG. 5 having reinforcing members according to another embodiment of the present invention.

Referring to FIGS. 5 to 7B, the conforming cover 300 partially covers lateral surfaces of the battery cells 100 and electrically connects the battery cells 100 to a PCM 900. The conforming cover 300 is a flexible printed circuit board (FPCB) including at least one wire 310 arranged within an insulation film 320, at least one coupling hole 330, at least one reinforcing member 340 and an adhesive layer 350.

The wire 310 is a path through which current from connection tabs 200 is transferred to the PCM 900, and one end thereof is connected to the connection tabs 200 and the other end thereof is connected to the PCM 900. Thus, there exists as many wires 310 as the number of connection tabs 200. The wires 310 respectively connected to first to fifth connection tabs 200a, 200b, 200c, 200d and 200e are denoted by reference numerals 310a, 310b, 310c, 310d, 310e, which will be described altogether.

Battery connecting pads 311a, 311b, 311c, 311d and 311e are formed at one end of the wires 310a, 310b, 310c, 310d and 310e respectively, and module connecting pads 312a, 312b, 312c, 312d and 312e are formed at the other end thereof. The battery connecting pads 311a, 311b, 311c, 311d and 311e are connected to the connection tab 200, and the module connecting pads 312a, 312b, 312c, 312d and 312e are connected to the PCM 900. Each of the battery connecting pads 311a, 311b, 311c, 311d and 311e may further include a cored-wire solder layer 315.

The insulation film 320 insulates the wires 310a, 310b, 310c, 310d and 310e from each other, while insulating the wires 310a, 310b, 310c, 310d and 310e from the outside. In addition, the insulation film 320 entirely surrounds the wires 310a, 310b, 310c, 310d and 310e. The insulation film 320 may be made out of polyimide and may have a thickness of 0.05 to 0.1 mm.

Further, openings 314 are formed at locations of the insulation film 320, corresponding to the battery connecting pads 311a, 311b, 311c, 311d and 311e and the module connecting pads 312a, 312b, 312c, 312d and 312e, exposing the battery connecting pads 311a, 311b, 311c, 311d and 311e and the module connecting pads 312a, 312b, 312c, 312d and 312e to the outside.

Coupling holes 330 are also formed in the insulation film 320. The coupling holes 330 are positioned at locations corresponding to the connection tabs 200 and are spaced a predetermined distance apart from the wires 310. The connection tabs 200 pass through the coupling holes 330 and are connected to the battery connecting pads 311a, 311b, 311c, 311d and 311e exposed through the openings 314. Therefore, the predetermined distance is shorter than a length of a pad contact portion of the connection tabs 200.

In the illustrated embodiment, the coupling holes 330 are formed at locations corresponding to a second connection tab 200b, a third connection tab 200c and a fifth connection tab 200e. However, as many coupling holes 330 as the connection tabs 200 may be formed at locations corresponding to the respective connection tabs 200. In addition, only one, at the least, of the connection tabs 200 may be formed.

The connection tabs 200 passing through the coupling holes 330 are bent in a substantially 'inverted L' ('¬') shape by bend portions respectively formed in the connection tabs 200, and are welded to the battery connecting pads 311a, 311b, 311c, 311d and 311e to fix the conforming cover 300 to the battery cells 100/dummy cells 500 combination.

In the embodiment of FIG. 7A, the reinforcing members 340 are formed in the vicinity of the coupling holes 330. That is to say, the reinforcing members 340 are formed in the vicinity of the coupling holes 330 formed in the conforming cover 300 while contacting outer peripheral portions of the coupling holes 330. In addition, the reinforcing members 340 surround at least both sides of upper and lower edges among the outer peripheral portions of the coupling holes 330 and are spaced apart from the wire 310c.

In the embodiment of FIG. 7A, the reinforcing member 340 is preferably formed to contact the outer peripheral portion of the coupling hole 330. In addition, the reinforcing member 340 may have any shape as long as it surrounds the upper edge 330a and a lower edge 330b, and may be made out of insulation tape, metal, or the same material as the wire 310c. Like the wires 310, here, the reinforcing member 340 may be made out of a metal foil such as a copper foil, a nickel foil or a steel foil coated/plated with nickel. Thus, the reinforcing member 340 is harder than the insulation film 320 made out of polyimide. In addition, in a case where an insulation tape is used as the insulation film 340, at the least, the insulation tape should have a hardness which is the same as that of the metal foil. Furthermore, the reinforcing member 340 is thicker than the insulation film 320, and may have a thickness of 0.1 to 0.2 mm, which is a thickness of the wires 310.

The reinforcing member 340 reinforces the conforming cover 300. Thus, in the course of assembling the pad contact portion 220c of the connection tab 200c to the coupling hole 330, it is possible to prevent peripheral portions of the coupling hole 330 from being broken by the edges of the connection tab 200c in a case where the respective locations of the pad contact portion 220c and the coupling hole 330 do not precisely coincide with each other, causing an interference fit or where the connection tab 200c moves during operation. In such a manner, the connection tab 200c is prevented from contacting another wire 310d formed in the vicinity of the coupling hole 330, thereby preventing a short from being generated.

Further, the reinforcing member 340 can prevent the conforming cover 300 from being broken due to movement of the connection tab 200c and the conforming cover 300 due to external impact even after the assembling, preventing the connection tab 200c from contacting the wire 310d arranged in the vicinity of the coupling hole 330, thereby preventing a short from being generated.

Furthermore, in a case where the conforming cover 300 is first connected to the PCM 900 and is then connected to the battery cells 100 in the course of manufacturing the battery pack 1000, in order to prevent damages from being applied to the PCM 900, the battery cells 100 are sequentially connected in order of a potential magnitude of the battery cell. However, since the reinforcing member 340 is additionally provided, electrical insulation between battery cells 100 and the PCM 900 is achieved by the reinforcing member 340, even in a state in which the connection tabs 200 are all fastened by the coupling holes 330 of the conforming cover 300, while electrical connection between battery cells 100 and the PCM 900 is achieved by the bend portions formed in the connection tabs 200. Therefore, in a state in which the connection tabs 200 are fastened to the coupling holes 330, electrical connection from a low potential battery cell to a high potential battery cell can be easily controlled simply by forming the bend portions, thereby simplifying the assembling process.

As shown in FIG. 7B, the reinforcing member 440 may be electrically connected to wire 310c and thus be integrally formed with wire 310c. In the manufacturing process, in a case where the reinforcing member 340 and the wire 310c are separately formed as in FIG. 7A, the coupling holes 330 and the reinforcing member 340 should be aligned to complete the conforming cover 300. However, the reinforcing member 440 may be manufactured in consideration of sizes of the coupling holes 330 and distances therebetween while integrally forming the reinforcing member 440 with the wire 310c. Accordingly, the aligning of the reinforcing members 440 and the coupling holes 330 may not become a matter of great concern, thereby simplifying the manufacturing process. In addition, if the reinforcing member 440 is integrally formed with the wire 310c, movement of the reinforcing member 440 can be prevented even after being manufactured.

The adhesive layer 350 allows the conforming cover 300 to be adhered to surfaces of the battery cells 100a, 100b, 100c and 100d. The adhesive layer 350 may be formed by coating an adhesive agent or a double-sided tape on a surface of the conforming cover 300.

The PCM 900 controls the battery pack 1000 and is connected to the module connecting pads 312a, 312b, 312c, 312d and 312e exposed by the openings 314. In more detail, the PCM 900 includes a substrate 910, a contact pad 920 provided on the substrate 910 and connected to the wires 310a, 310b, 310c, 310d and 310e, control elements 930 provided on the substrate 910 and including IC devices, and an external connecting member 940 provided on a lateral surface of the substrate 910 and connecting the battery pack 1000 to an external device. The PCM 900 may charge or discharge the respective battery cells 100a, 100b, 100c, 100d and 100e using the wires 310a, 310b, 310c, 310d and 310e, respectively.

Figure 8:
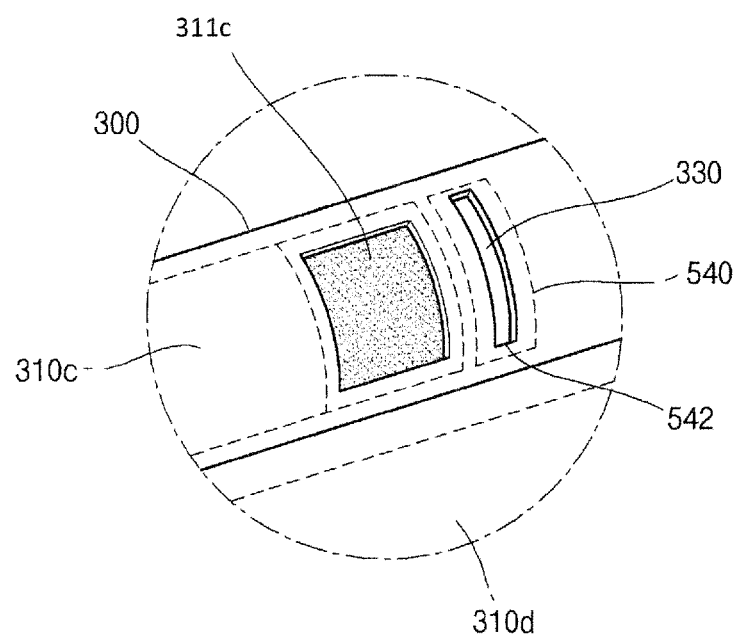
FIG. 8 is a partially enlarged view of portion 'D' of the conforming cover shown in FIG. 5 which includes a reinforcing member according to another embodiment of the present invention.

A reinforcing member according to still another embodiment of the present invention will next be described. Turning now to FIG. 8, FIG. 8 is a partially enlarged view of a reinforcing member according to still another embodiment of the present invention. Referring now to FIG. 8, the battery pack according to the illustrated embodiment is different from the battery pack according to the previous embodiment in view of configuration of a reinforcing member 540. Thus, the following description will focus on the reinforcing member 540. In addition, since functional components other than the reinforcing member 540 are the same as those of the previous embodiments, they are denoted by the same reference numerals and repeated descriptions will not be given.

In the embodiment of FIG. 8, the reinforcing member 540 is formed to entirely surround the outer peripheral side of the coupling hole 330, and has an opening or hole 542 sized and shaped to correspond to the coupling hole 330 at its center. In addition, the reinforcing member 540 in FIG. 8 is shown to be spaced-apart from the wire 310c, however the reinforcing member 540 of FIG. 8 can instead be modified so that it is integrally formed with the wire 310c, like the reinforcing member 440 according to the previous embodiment shown in FIG. 7B. That is to say, the reinforcing member 540 can be made out of the same material, be produced at the same time in the same process, and be attached to wire 310c, thereby preventing the reinforcing member from moving.

The reinforcing member 540 may have any shape as long as it surrounds the outer peripheral side of the coupling hole 330, and may be made of an insulation tape, a metal, or the same material as the wire 310c.

The same effects as in the previous embodiment shown in FIG. 7A can be exerted by forming the reinforcing member 540. However, unlike the reinforcing members 340 according to the previous embodiment shown in FIG. 7A, the reinforcing member 540 surrounds not only upper and lower portions of the coupling hole 330 but reinforcing member 540 entirely surrounds coupling hole 330. Thus, the reinforcing member 540 can reinforce not only the upper and lower portions of the coupling hole 330, but also lateral portions thereof. Accordingly, it is possible to prevent the connection tab 200c from being severely bent and protruding toward the lateral portions of the coupling holes 330. In addition, it is also possible to prevent the connection tab 200c from contacting another wire 310d formed in the vicinity of the coupling hole 330, thereby preventing a short from being generated.

Figure 9:
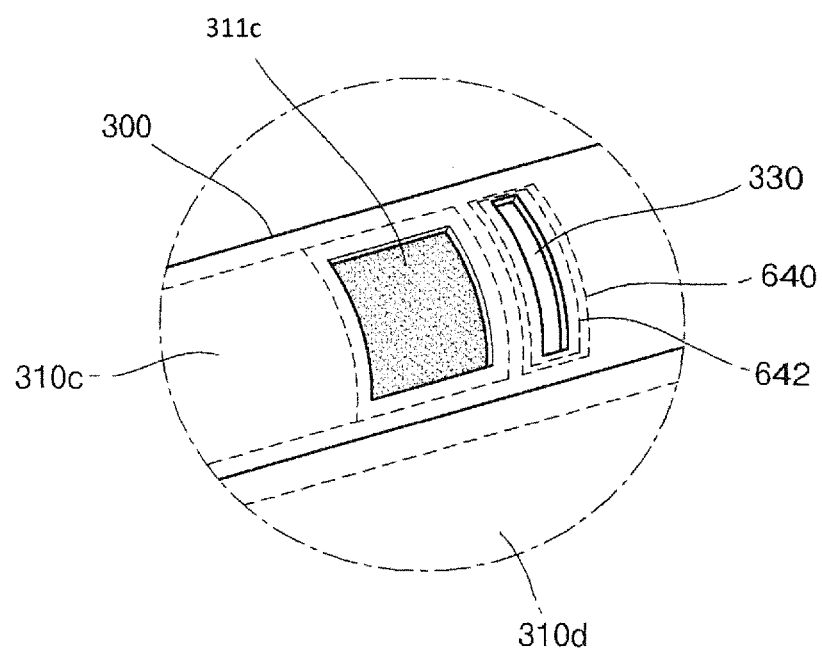
FIG. 9 is a partially enlarged view of portion 'D' of the conforming cover shown in FIG. 5 which includes a reinforcing member according to another embodiment of the present invention.

A reinforcing member according to a further embodiment of the present invention will next be described. Turning now to FIG. 9, FIG. 9 is a partially enlarged view of a reinforcing member according to a further embodiment of the present invention. Referring now to FIG. 9, the battery pack according to the illustrated embodiment is different from the battery pack according to the previous embodiment in view of configuration of a reinforcing member 640. Thus, the following description will focus on the reinforcing member 640. In addition, since functional components other than the reinforcing member 640 are the same as those of the previous embodiment, they are denoted by the same reference numerals and repeated descriptions will not be given.

The reinforcing member 640 is formed to entirely surround outer peripheral sides of a coupling hole 330. An opening or hole 642 shaped to correspond to the coupling hole 330 is formed at the center of the reinforcing member 640, and the size of the opening 642 is greater than that of the coupling hole 330. Thus, unlike in the previous embodiments, the reinforcing member 640 is not brought into contact with the outer peripheral sides of the coupling hole 330. In addition, the reinforcing member 640 is spaced apart from a wire 310c. In a variation of the embodiment of FIG. 9, reinforcing member 640 may also be integrally formed with the wire 310c, like the reinforcing member 440 according to the previous embodiment shown in FIG. 7B, thereby preventing the reinforcing member from moving.

The reinforcing member 640 may have any shape as long as it entirely surrounds the outer peripheral sides of the coupling hole 330 and the size of the hole 642 formed in the reinforcing member 640 is greater than that of the coupling hole 330. In addition, the reinforcing member 640 may be made of an insulation tape, a metal, or the same material as the wire 310c.

The same effects as in the previous embodiment shown in FIG. 8 can be exerted by forming the reinforcing member 640. However, unlike the reinforcing members 540 according to the previous embodiment shown in FIG. 8, the size of the hole 642 formed in the reinforcing member 640 is greater than that of the coupling hole 330. Thus, the internal space of the hole 642 is larger than the internal space of the previous embodiment. This feature is significant in the scenario where the locations of the connection tab 200c and the coupling hole 330 do not precisely coincide with each other, causing an interference fit. When this occurs, the connection tab 200c and the coupling hole 330 can be easily assembled to each other.

Although exemplary embodiments of the present invention have been disclosed for illustrative purposes, those skilled in the art will appreciate that various modifications, additions and substitutions are possible, without departing from the spirit of the invention as disclosed in the accompanying claims.

What is claimed is:

1. A battery pack, comprising:
   a battery cell;
   a connection tab electrically connected to the battery cell;
   a protection circuit module (PCM) electrically connecting the battery cell to an external device; and
   a flexible printed circuit board (FPCB) including a wire arranged within an insulation film, the wire electrically connecting the PCM to the connection tab connected to the battery cell, the FPCB further including a coupling aperture through which the connection tab extends therethrough and a reinforcing member that surrounds at least a portion of the coupling aperture and being arranged in a vicinity of the coupling aperture,
   wherein the coupling aperture and the reinforcing member being spaced apart from where the connection tab is electrically coupled to the FPCB.

2. The battery pack of claim 1, the connection tab comprising:
   a battery contact portion directly welded to a terminal of the battery cell;
   a pad contact portion arranged opposite from the battery contact portion and being electrically connected to the wire of the FPCB; and
   a bend portion arranged between the battery contact portion and the pad contact portion, the bend portion adapted to allow the pad contact portion to bend with respect to the battery contact portion, the bend being arranged at the coupling aperture.

3. The battery pack of claim 1, said reinforcing member being comprised of an insulation tape having a hardness that is greater than that of the wire.

4. The battery pack of claim 1, the insulation film comprising polyimide, the reinforcing member comprising a metal foil selected from a group consisting of a copper foil, a nickel foil and a steel foil coated/plated with nickel.

5. The battery pack of claim 1, the reinforcing member having a thickness greater than the insulation film.

6. The battery pack of claim 1, the reinforcing member having a hardness that is at least as great as that of the wire.

7. The battery pack of claim 1, said reinforcing member to prevent the FPCB from being broken in a vicinity of the coupling aperture by the connection tab.

8. The battery pack of claim 1, the connection tab being interference fit with the FPCB at the coupling aperture of the FPCB.

9. The battery pack of claim 1, the reinforcing member being comprised of a same material as the wire and being integrally formed with said wire of the FPCB.

10. The battery pack of claim 1, the coupling aperture being an elongated rectangle with a pair of long edges connected by a pair of short edges, the reinforcing member of the FPCB being arranged only in a vicinity of the short edges of the coupling aperture and at an adjoining portion of the long edges of the coupling aperture.

11. The battery pack of claim 1, the reinforcing member of the FPCB completely surrounding the coupling aperture.

12. The battery pack of claim 1, the reinforcing member surrounding an outer periphery of the coupling aperture and being spaced-apart from outer peripheral sides of the coupling aperture.

13. The battery pack of claim 1, the reinforcing member surrounding an outer periphery of the coupling aperture, having a size and location that corresponds to the coupling aperture at its center, a size of the aperture of the reinforcing member being greater than that of the coupling aperture, the reinforcing member being spaced-apart from outer peripheral sides of the coupling aperture.

14. The battery pack of claim 1, the reinforcing member entirely surrounding an outer periphery of the coupling aperture, the reinforcing member being in contact with outer peripheral sides of the coupling aperture.

15. A battery pack, comprising:
    a battery cell;
    a connection tab electrically connected to the battery cell;
    a protection circuit module (PCM) electrically connecting the battery cell to an external device; and
    a flexible printed circuit board (FPCB) including a wire arranged within an insulation layer to electrically connect the PCM to the connection tab, wherein the FPCB further includes:
       a battery contact pad arranged within a first opening in the insulation film to connect the wire to the connection tab,
       a coupling aperture arranged near the battery contact pad, the connection tab extending through the coupling aperture,
       a module connecting pad arranged within a second opening in the insulation film to connect the wire to the PCM, and
       a reinforcing member arranged in a vicinity of the coupling aperture to prevent the FPCB from tearing in the vicinity of the coupling aperture,
       wherein the coupling aperture and the reinforcement member are spaced apart from the battery contact pad.

16. The battery pack of claim 15, the connection tab comprising:
    a battery contact portion welded directly to a terminal of the battery cell;

a pad contact portion arranged opposite from the battery contact portion and being attached to the wire of the FPCB; and a bend portion arranged between the battery contact portion and the pad contact portion, the bend portion to allow the pad contact portion to bend with respect to the battery contact portion, the bend portion corresponding to a location of the coupling aperture.

17. The battery pack of claim 15, the reinforcing member being comprised of an insulation tape having a hardness that is greater than that of the wire.

18. The battery pack of claim 15, the reinforcing member having a thickness greater than the insulation film, the coupling aperture being elongated, the reinforcing member surrounding only end portions only of the elongated coupling aperture.

19. The battery pack of claim 15, the reinforcing member being comprised of a same material as the wire and being electrically connected to the wire.

20. The battery pack of claim 16, the pad contact portion of the connection tab being perforated by an aperture and being connected to the battery contact pad of the FPCB by a core-wire solder layer, the pad contact portion being spaced-apart from the coupling aperture.

* * * * *